Feb. 13, 1934.  R. J. LEVY  1,947,014
X-RAY APPARATUS
Filed Jan. 17, 1927
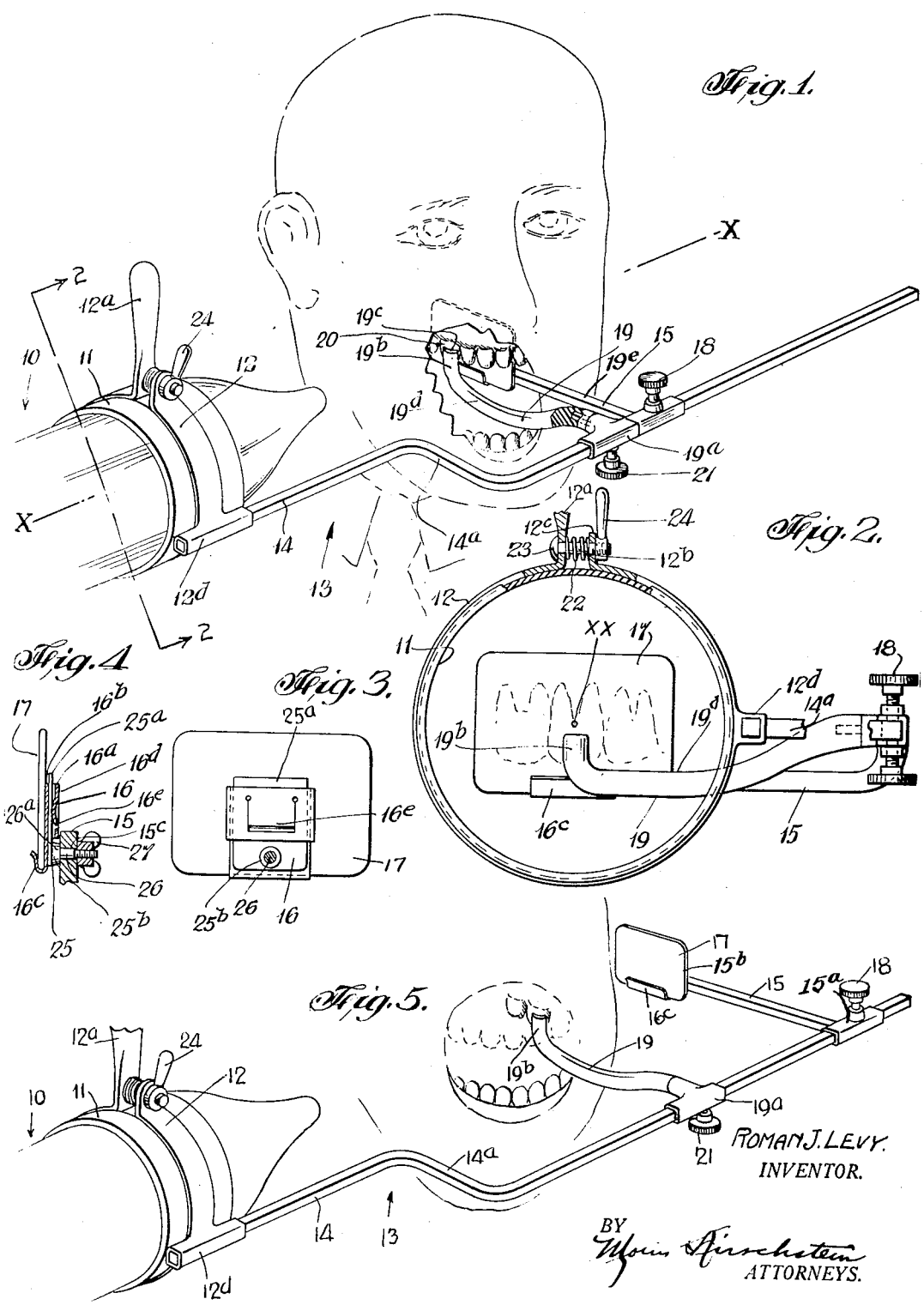
Roman J. Levy
INVENTOR.
BY Morris Kirschstein
ATTORNEYS.

Patented Feb. 13, 1934

1,947,014

UNITED STATES PATENT OFFICE 1,947,014

X-RAY APPARATUS

Roman J. Levy, New York, N. Y., assignor to Antonina Levy, New York, N. Y.

Application January 17, 1927. Serial No. 161,502

16 Claims. (Cl. 250—34)

This invention relates to X-ray apparatus and more particularly is directed to film positioning devices adapted especially for dental work.

One object of the invention is to provide an improved device of the character described, which easily and quickly positions the film in proper relation to the projected X-rays for taking an undistorted picture of a desired region of the patient's body.

Another object of the invention is to provide a device of the character described of improved construction, which permits taking pictures of a desired region of the patient's mouth with the film supported either within or exterior of the mouth.

A further object of the invention is to provide a device of the character described having novel means for supporting the film to permit unrestricted adjustment of said film in the plane for taking undistorted pictures so that a desired area may be readily radiographed, and whereby the film is positioned within the patient's mouth with less discomfort to the patient.

Still another object of the invention is to provide in a device of the character described, an improved form of indicator for aligning the film with the X-ray machine so that a predetermined region of the patient's jaw may be radiographed from any angle without producing a distorted picture.

A further object of the invention is to provide an improved device of the character described, which shall comprise few and simple parts, be cheap to manufacture, easy and convenient to operate, and practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a perspective view showing a device embodying the invention positioned for radiographing the region about a tooth in the upper right-hand jaw, the film being positioned within the mouth.

Fig. 2 is a cross-sectional view corresponding to a cut taken on line 2—2 showing the relative position of the film indicator and X-ray tube.

Figs. 3 and 4 are plan and side elevational views of the film and the improved support therefor.

Fig. 5 is a perspective view similar to Fig. 1 showing the position of the device when radiographing the region about a tooth in the upper left-hand portion of the jaw, the film being positioned exteriorly.

Referring in detail to the drawing, 10 denotes the ray projecting end of a dental X-ray tube, such as a Coolidge tube. Mounted on the latter is a ring 11 adapted to releasably support a band 12 which forms the mounting end of a device 13 embodying the invention for aligning the apparatus for taking pictures in a predetermined region of a patient's mouth. Said device 13 is seen to comprise an elongated bar member 14 which has an offset portion 14a which serves as a guard for limiting the approach of the patient's head to a safe distance from the tube so as to eliminate possible accidental burning injury to the patient. A carrier 15 having one end 15a thereof slidably mounted on said bar has its free end 15b terminated by a holder 16 which adjustably supports a film 17. The slidable end of the carrier may be provided with suitable means for clamping the carrier in position, such as thumb screws 18. An indicator 19 has one end 19a mounted for slidable movement along the bar 14, the free end 19b of said indicator being formed with a surface 19c adapted to be applied and conform to a portion of the contour of the region to be radiographed on the film. As illustrated in Fig. 1, said surface 19c is made to conform to the shape of the tooth 20 in the right upper jaw of the patient. The slidable end of said indicator may also be provided with suitable means, such as thumb screw 21, for adjustably clamping the indicator in a set position.

The band 12 is mounted for rotary movement on the ring 11 and is provided with a finger-piece 12a and an adjustable clamp fastening 12b. Said fastening is seen to comprise a compression spring 22 interposed between the finger piece 12a and an upstanding end lug 12c. A bolt 23 having a winged nut 24 threaded on the end thereof extends through said finger-piece and lug for constricting the size of the band against action of the spring, as is clearly shown in Fig. 2. The band also is provided with a socket portion 12d which rigidly supports the bar member 14 of the device 13 to extend in parallel alignment with respect to a central axis XX, shown as a dot and dash line in Fig. 1, of the path of X-rays projected from the end of the Coolidge tube. By loosening the winged nut 24, the band 12 may be released and the device 13 rotated about the axis XX to any desired position for positioning the indicator and the film as will hereinafter more fully be described.

The film holder 16 may be of any suitable construction and as here shown comprises a flattened tubular body portion 16a having the front side 16b of said portion bent to form a spring gripping lip 16c which is adapted to clamp an edge portion of the film 17. The rear flattened side 16d of said body portion may be formed with a spring tongue 16e which extends towards the front side 16b. One end 25a of a stanchion strip 25 is adapted to be inserted between the front and rear sides of the body portion 16a and said body portion is retained in a set position on the stanchion by the action of the spring tongue 16e, as is clearly shown in Figs. 3 and 4. The opposite end 25b of said stanchion is formed with suitable means for pivoting the holder 16 on the end of the carrier 15. Said means may comprise a pivoting screw 26. The head 26a thereof serves as a collar for spacing the stanchion from the carrier 15, said screw being journaled in an opening 15c provided in the free end of the carrier. A winged nut 27 engaging the threaded end of the screw 26 serves to clamp the screw and stanchion in any set position. The construction of the film holder and its fastening means to the carrier permits the easy removal of the film holder for conveniently replacing the film since the holder is demountably attached to the stanchion 25. The lip 16c permits lateral displacement of the film 17 with respect to the holder 16 and the pivoting screw 26 permits the rotation of the film with respect to the carrier. It should be noted that the lip 16c clamps a relatively small edge portion of one side of the film 17 leaving the remaining edge portion of said side and the other three sides of the film free to conform to the contour of the mouth adjacent the portion to be radiographed, thus eliminating to a great extent possible discomfort to the patient. The standard form of film is pliable and in the applicant's construction, the holder 16 is made relatively small and forms a stiff structure which extends as a backing only for the mid-portion of the film, thus leaving substantially the entire edge portions of the film free to conform to the contour of the patient's mouth adjacent to the region being radiographed. From Fig. 4, it is clear that the holder 16 may be mounted on the opposite side of the carrier if it is desired to expose the film to rays projected from the opposite direction to that shown in the drawing.

The portion 19b of the indicator 19 is preferably made of a suitable material through which X-rays easily pass and may comprise an interchangeable part 19d. Said part 19d may detachably connect with the sliding end 19a by means of a slot and pin connection 19e, the pin and slot being of non-circular cross-section to prevent rotating the part 19d with respect to the sliding end 19a, as shown in Fig. 1. The part 19d may be interchanged with similarly constructed parts having surfaces 19c of varying contour to conform to the shape of the different regions of the patient's mouth which are to be radiographed.

The practical application of the invention will now be apparent. Let it be assumed that the region about the tooth 20 is to be radiographed. The device 13 is adjusted as shown in Fig. 1. The offset portion 14a guards the patient from approaching too closely to the end of the tube where he may be injured due to burns from the projected rays. A suitable interchangeable part 19d is selected which has an end surface 19c that conforms to the shape of the tooth 20. This is mounted on the indicator end 19a and the indicator is placed against the front of the tooth. The film 17 mounted in the holder 16 is then positioned by sliding the carrier 15 so that the film 17 is set directly behind the tooth 20. The thumb screws 18 and 21 may now be tightened to set the indicator and film in adjusted position. The film is now in proper alignment to radiograph the predetermined region about the tooth and an undistorted picture will result due to the positioning effect by said surface 19c since the projected rays in passing from the tube are received on the film in a perpendicular relation to the path of said rays. The edge portion of the film with the exception of that clamped in the lip 16c is permitted to conform with the adjacent contour of the mouth, thus minimizing discomfort to the patient. It should be noted that the film may be shifted transversely, up and down or rotated in any desired position with respect to the carrier for positioning the film in a plane to take the undistorted picture so as to include the regions bordering that for which the device is adjusted. As shown in Fig. 2, the end surface 19c is preferably made to terminate a spaced distance from the axis XX so that the most concentrated rays will pass through the unexposed and uncovered portion of the tooth above the indicator so that a clear sharp picture of the root portion of the tooth is produced on the film.

Fig. 1 shows a method of using the improved device for radiographing a predetermined region with the film positioned within the mouth. In Fig. 5 is shown a method for radiographing predetermined regions with the film positioned exteriorly of the mouth. The provision of this alternative method of taking pictures with the film exterior of the mouth is very desirable since nervous patients are liable to gag when the film is inserted in the mouth. With the improved device 13, it is possible to radiograph any predetermined region of the patient's jaws from any angle, said device in each case retaining the film in proper position for taking an undistorted picture.

The invention has been described and shown with reference to its application for dental purposes. It will be understood, however, that the principle thereof may also be applied in taking X-rays of other parts of the body. For such purposes, however, it is not always possible to position the indicator in direct alignment with the portion being X-rayed because such portion may be so located in the body as to be inaccessible. For example, in applying this invention to X-raying a sinus which is in the interior of the head, the indicator could not be adjusted in position the same as in the case of X-raying teeth. In such event, I contemplate positioning the indicator relative to some other adjacent exterior part which is accessible and at the desired angle relative to another adjacent external organ which is known anatomically to make a definite angle with the organ being X-rayed. From such known angle, the tube may be positioned relative to the organ in the same way as if the indicator itself had been properly positioned relative to the organs of the X-ray.

Obviously the band 12 may be detached from the X-ray tube 10, and the tube merely manipulated or positioned by the operator to bring the axis of the tube in alignment with the axis of said band 12. In such case, the support 14 together with the band 12, the indicator 19 and the film support 15 may be supported by the patient. As illustrated in Fig. 1, the end 19b of the indicator and the film are clamped to opposite sides of the teeth or region to be radiographed for that purpose. The support 14 may thus be supported by the patient instead of on the X-ray apparatus. The annular band 12 attached at the rim thereof to the support 14 serves as a means for positioning the X-ray tube with respect to the axis of the band which passes through substantially the middle of the film. By attaching the elongated member 14 to the rim of the band, the entire band opening is free so that the tube may be readily pointed to the middle of said band opening.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. A device of the character described comprising an elongated member having one end adapted to mount the device to extend from an X-ray apparatus, a carrier having one end slidably mounted on said member, the other end of said carrier terminating in a film engaging means, an indicator having an end slidably mounted on said member, the free end of said indicator being formed with a surface adapted to be applied and conform to a portion of the contour of the region to be photographed to aid in producing undistorted pictures on a film in said engaging means.

2. A device comprising an elongated member having one end adapted to mount the device to extend from an X-ray apparatus, a carrier having one end slidably mounted on said member, the other end of said carrier terminating in a film engaging means, an indicator having an end slidably mounted on said member, the free end of said indicator being formed with a surface adapted to be applied and conform to a portion of the contour of the region to be radiographed to aid in producing undistorted pictures on a film in said engaging means, the material forming said indicator having the property of permitting substantially unrestricted passage to X-rays.

3. A device of the character described comprising an elongated member having one end adapted to mount the device to extend from an X-ray apparatus, a carrier having one end slidably mounted on said member, the other end of said carrier terminating in a film engaging means, an indicator having an end slidably mounted on said member, the free end of said indicator being formed with a surface adapted to be applied and conform to a portion of the contour of the region to be radigraphed to aid in producing undistorted pictures on a film in said engaging means, said member having means to limit the approach of the patient's head to the apparatus whereby accidental injury by burning is eliminated.

4. In a device of the character described, a dental X-ray apparatus, an elongated member having means at one end engaging said apparatus for mounting the device to extend from the latter, a carrier adjustably mounted on said member, a film mounted in said carrier, and indicator means for aligning the film with a central axis of the X-rays projected from the machine to radiograph a predetermined region of the patient's mouth, one end of the indicator being slidably mounted on said member, the free end of said indicator being formed with a surface adapted to be applied and conform to a portion of the contour of the region to be radiographed.

5. In a device, a dental X-ray apparatus, an elongated member having means at one end engaging said apparatus for mounting the device to extend from the latter, a carrier adjustably mounted on said member, a film mounted in said carrier, and indicator means for aligning the film with a central axis of the X-rays projected from the apparatus to radiograph a predetermined region of the patient's mouth, one end of the indicator being slidably mounted on said member, the free end of said indicator being formed with a surface adapted to be applied and conform to a portion of the contour of the region to be radiographed, the free end of said indicator terminating a spaced distance from said axis.

6. A device of the character described comprising mounting means adapted to extend from an X-ray apparatus, a film means attached to said mounting means for supporting said film, and indicator means also attached to said mounting means adapted to be applied at a predetermined region of the patient's body for aligning the film with said apparatus to produce an undistorted picture of said region, said film supporting means and indicator being slidable relative to one another, said film supporting means including a demountable holder for the film.

7. In combination with a tube and tube casing for producing X-rays, a device supported by the tube casing comprising means for supporting a film perpendicular to the axis of the rays projected from said tube, and an indicator means interposed in the path of the rays for aligning a predetermined region of the patient's body with respect to said axis and the film to produce an undistorted picture of said region, said indicator means terminating a spaced distance from said axis.

8. A device of the character described comprising mounting means adapted to extend from an X-ray apparatus, means mounted on said mounting means for supporting a film, and indicator means mounted on said mounting means in a predetermined position with respect to said supporting means, said indicator means having a projection designed to extend into the patient's mouth for aligning the film with said apparatus.

9. A device of the character described comprising means mounted on an X-ray apparatus, means attached to said mounted means for supporting a film in alignment with said apparatus to radiograph a predetermined region of a patient's body, said supporting means comprising means for latterly and rotatably adjusting the position of the film, and an indicator slidably mounted on said mounted means in a predetermined position with respect to said film supporting means said film supporting means and indicator being slidable relative to one another.

10. A device of the character described comprising an elongated member having means for attachment to an X-ray apparatus, a film holder slidably mounted on said member, and an indicator slidably mounted on said member in a predetermined position with respect to said film holder, said film holder and indicator being relatively movable with respect to each other.

11. A device of the character described comprising an X-ray tube for taking dental radiographs, an elongated support, means for attaching said support to said tube, a film supporting means mounted on said support, a film mounted on said means and an indicator having a portion adapted to contact a portion of the patient's mouth, mounted on said support in parallel relation to said film supporting means, said indicator having an end portion in a predetermined relation to the film and attaching means, for aligning said film with said tube for radiographing a predetermined region of the patient's jaw.

12. A device of the character described comprising mounting means adapted to extend from an X-ray apparatus, means mounted on said mounting means for supporting a film, and indicator means demountably and slidably supported on said mounting means adapted to be applied to and contact a predetermined region of the patient's body, said film supporting means and indicator means being mounted in parallel relation for aligning the film with said apparatus to produce an undistorted picture of said region.

13. An accessory for dental X-ray apparatus comprising an annular band, an elongated support attached to the rim of said band, a member having a surface adapted to contact the patient's teeth mounted on said elongated support, and a film supported on said support in predetermined relation to said member and band said member being movable on said support separately of said film.

14. An accessory for dental X-ray apparatus comprising an annular band, an elongated support attached to the rim of said band, a member having a surface adapted to contact the patient's teeth movably mounted on said elongated support, and a film supported on said support in predetermined relation to said member and band, the axis of said band being substantially perpendicular to said film and passing substantially through the middle of said film and adjacent to said surface.

15. An accessory for dental X-ray apparatus comprising an annular band, an elongated support attached to the rim of said band, a member adapted to contact the patient's teeth movably mounted on said elongated support, and a film supported on said support in predetermined relation to said member and band, said film and band being movable toward and away from one another.

16. An X-ray tube, an annular band adapted to be positioned in a plane perpendicular to the axis of said tube, an elongated member extending from the rim of said band, a film supporting member slidably mounted on said elongated member, and a film on said film supporting member, the axis of said band passing substantially through the middle of said film, and means movably mounted on said elongated member adapted to be contacted by the patient's teeth for properly positioning the film with respect to the portion to be radiographed.

ROMAN J. LEVY.